United States Patent
Abedini et al.

(10) Patent No.: US 9,913,233 B2
(45) Date of Patent: Mar. 6, 2018

(54) SYNCHRONIZATION FOR DEVICE-TO-DEVICE POSITIONING IN WIRELESS NETWORKS

(71) Applicant: QUALCOMM Incorporated, San Diego, CA (US)

(72) Inventors: Navid Abedini, Raritan, NJ (US); Shailesh Patil, Raritan, NJ (US); Libin Jiang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 14/811,678

(22) Filed: Jul. 28, 2015

(65) Prior Publication Data
US 2017/0034800 A1  Feb. 2, 2017

(51) Int. Cl.
*H04W 56/00*  (2009.01)
*H04W 76/02*  (2009.01)
*H04W 4/02*  (2018.01)
*H04W 24/08*  (2009.01)

(52) U.S. Cl.
CPC ....... *H04W 56/0015* (2013.01); *H04W 4/023* (2013.01); *H04W 24/08* (2013.01); *H04W 56/002* (2013.01); *H04W 56/0045* (2013.01); *H04W 76/023* (2013.01)

(58) Field of Classification Search
CPC . H04W 56/0015; H04W 4/023; H04W 24/08; H04W 56/002; H04W 56/0045; H04W 76/023
See application file for complete search history.

(56) References Cited

U.S. PATENT DOCUMENTS 8,630,281 B2  1/2014  Li et al.
8,767,662 B1 *  7/2014  Park .................... H04W 52/346
                                                                370/329

FOREIGN PATENT DOCUMENTS

WO  2009009356 A1  1/2009
WO  2014018333 A2  1/2014

OTHER PUBLICATIONS

International Search Report and Written Opinion—PCT/US2016/039590—ISA/EPO—Oct. 4, 2016.

* cited by examiner

*Primary Examiner* — Chandrahas Patel
(74) *Attorney, Agent, or Firm* — Arent Fox LLP

(57) ABSTRACT

A method, an apparatus, and a computer program product for wireless communication are provided. The apparatus may be a UE. The apparatus may transmit a message in a first subset of a set of resources. The message may include a position of the apparatus and a resource ID indicating at least one symbol in a second subset of the set of resources for transmitting a sequence. The apparatus may transmit the sequence in the at least one symbol in the second subset of the set of resources identified by the resource ID, receive at least one other sequence, adjust a transmission timing based on the received at least one other sequence, and transmit, based on the adjusted transmission timing, the sequence in one or more symbols in a third subset of the set of resources.

30 Claims, 13 Drawing Sheets

SYNCHRONIZATION FOR DEVICE-TO-DEVICE POSITIONING IN WIRELESS NETWORKS

BACKGROUND

Field

The present disclosure relates generally to communication systems, and more particularly, to enabling synchronization between devices to provide device-to-device (D2D) positioning in wireless networks.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a user equipment (UE). The apparatus transmits a message in a first subset of a set of resources, and the message includes a position of the apparatus and a resource identifier (ID) indicating at least one symbol in a second subset of the set of resources for transmitting a sequence. The apparatus transmits the sequence in the at least one symbol in the second subset of the set of resources identified by the resource ID. The apparatus receives at least one other sequence from at least one other UE. The apparatus adjusts a transmission timing based on the received at least one other sequence received from the at least one other UE. The apparatus transmits, based on the adjusted transmission timing, the sequence in one or more symbols in a third subset of the set of resources, in which the one or more symbols is identified by the resource ID.

DETAILED DESCRIPTION

Figure 1:
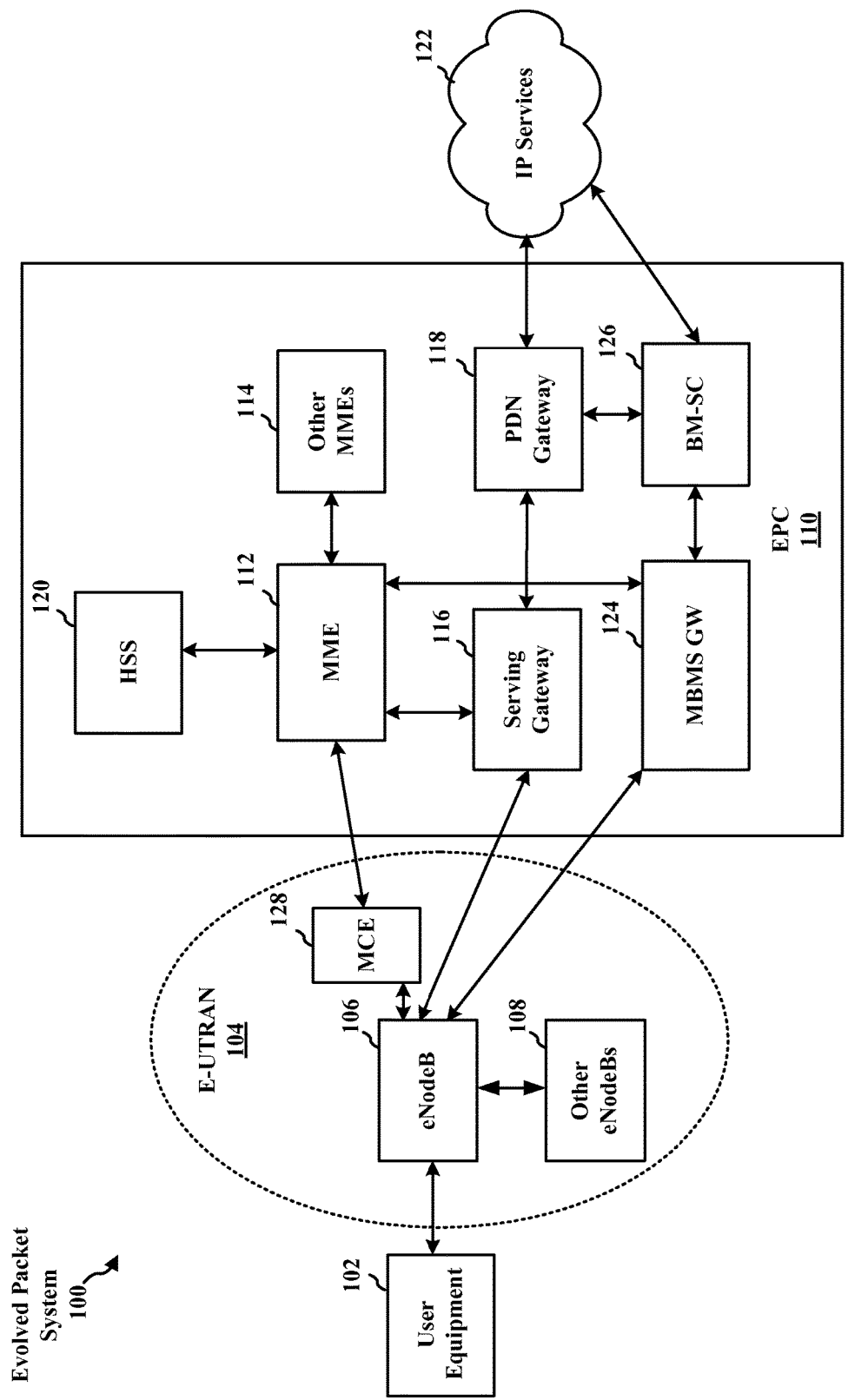
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
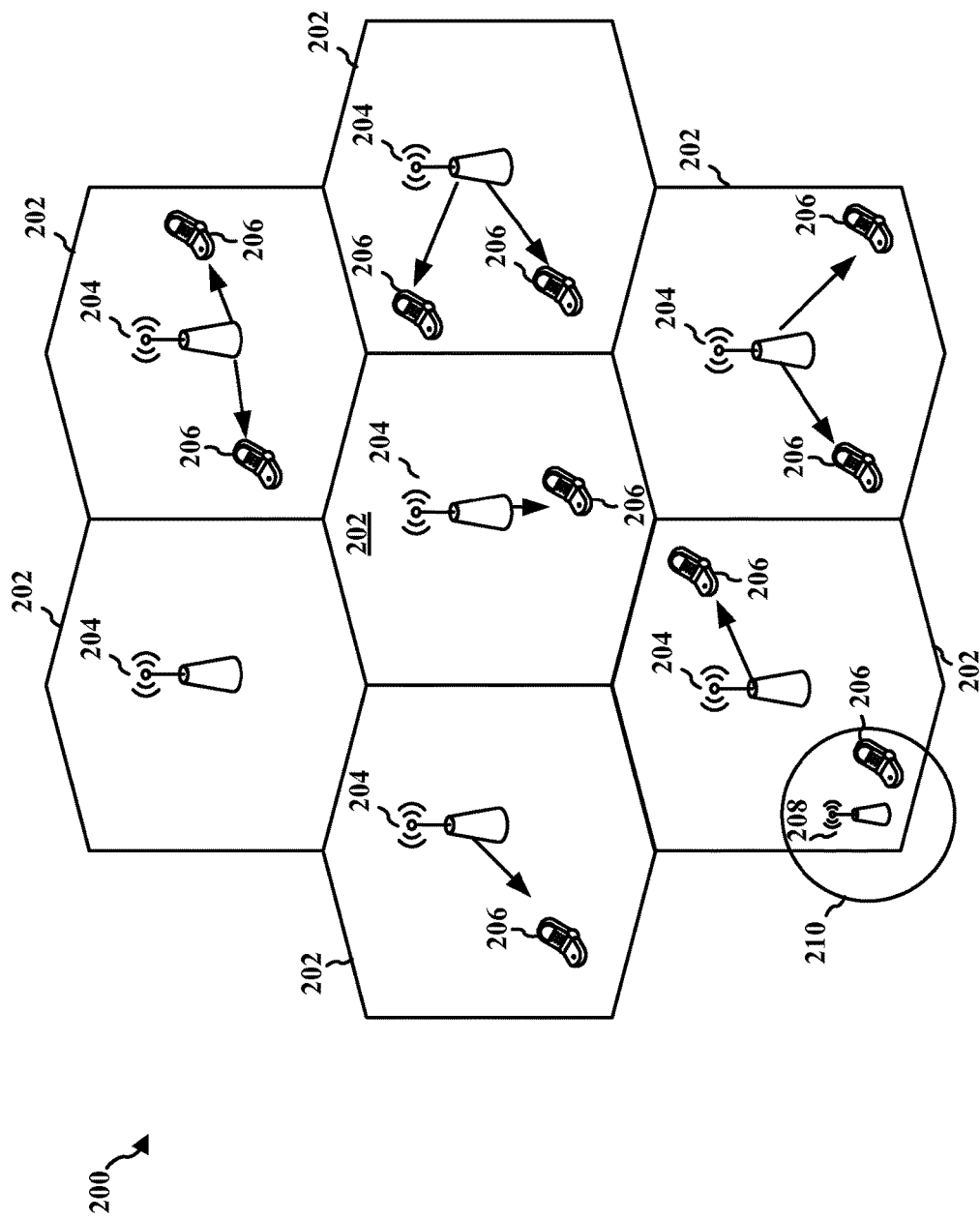
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
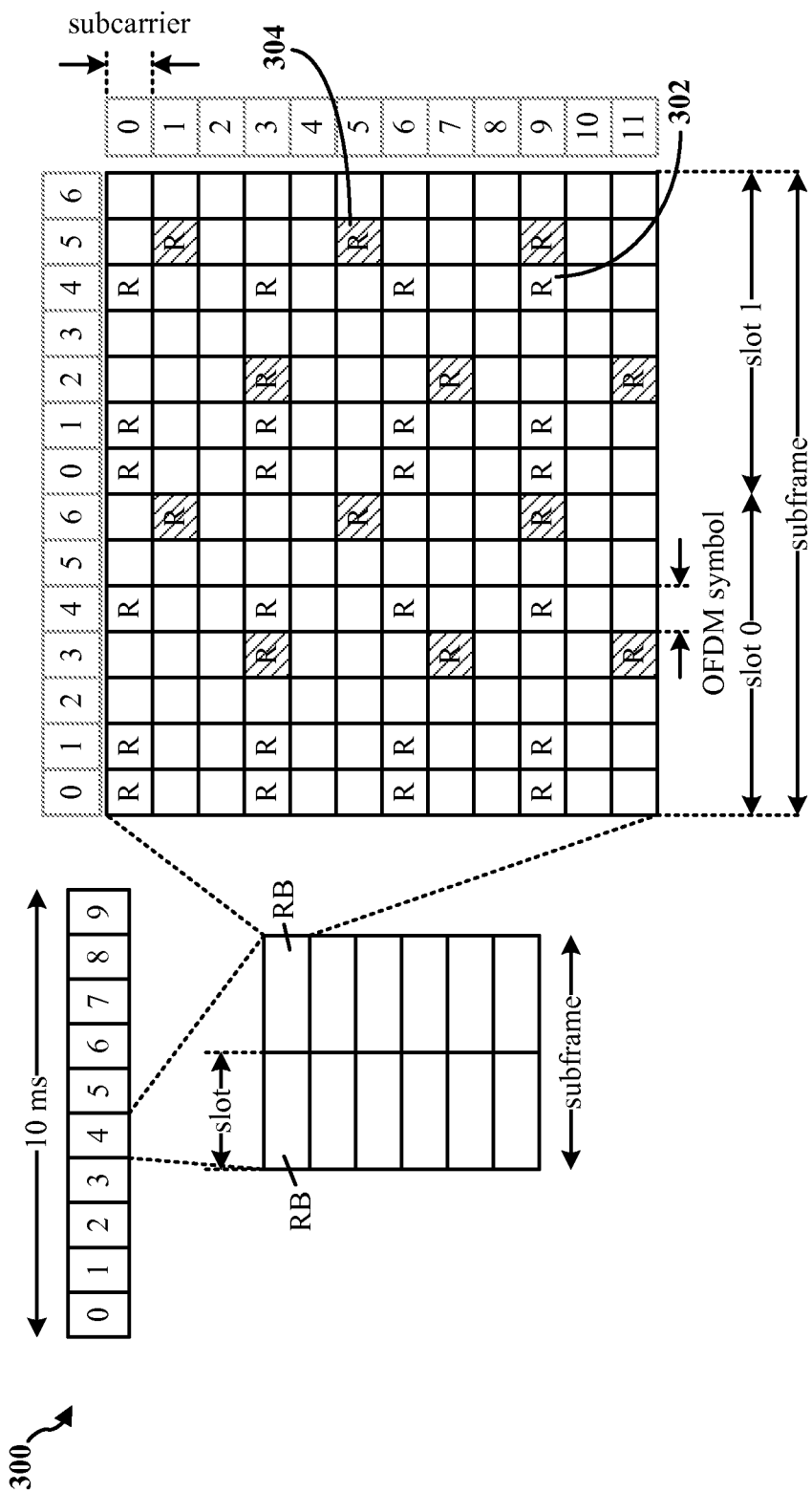
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
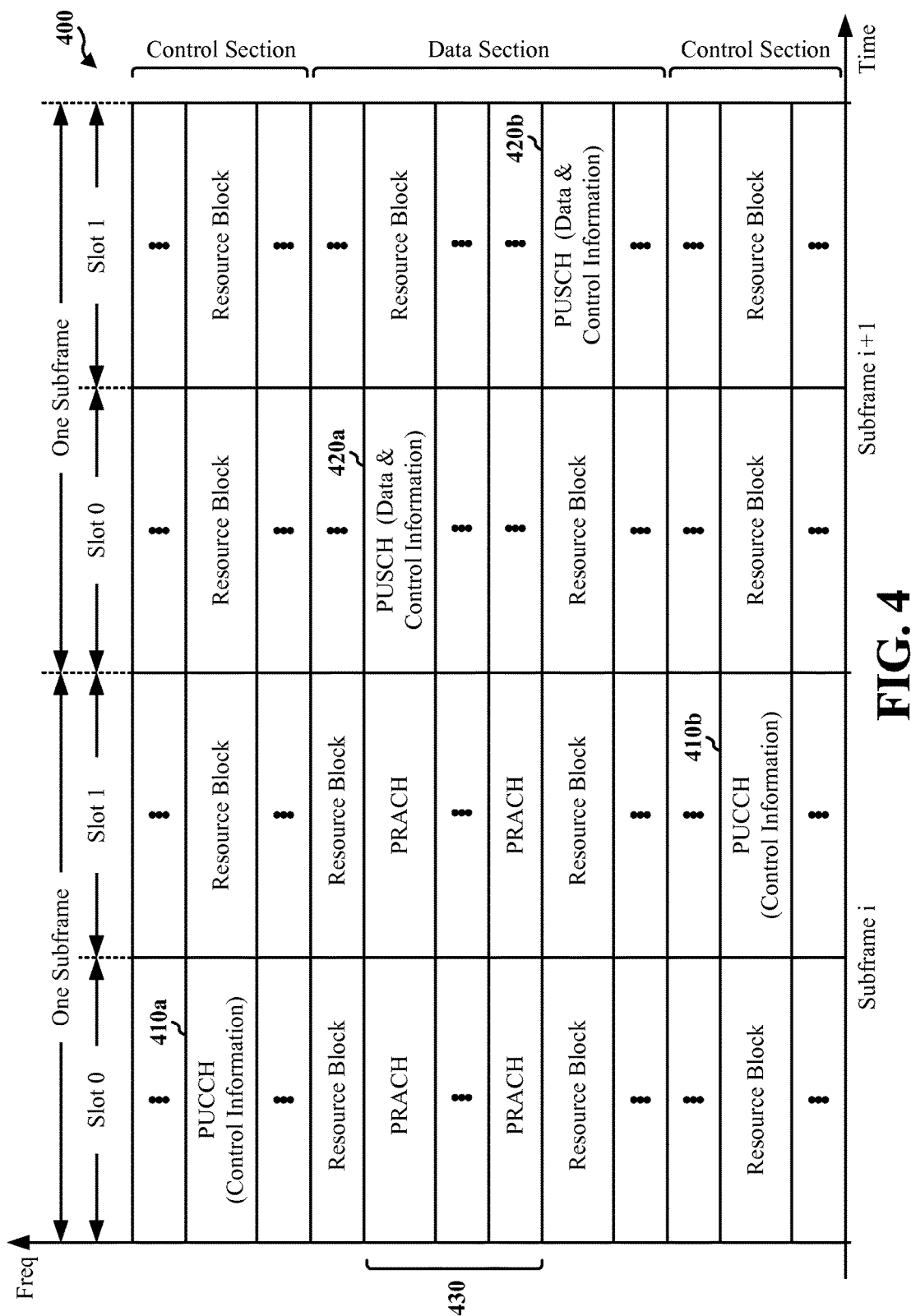
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
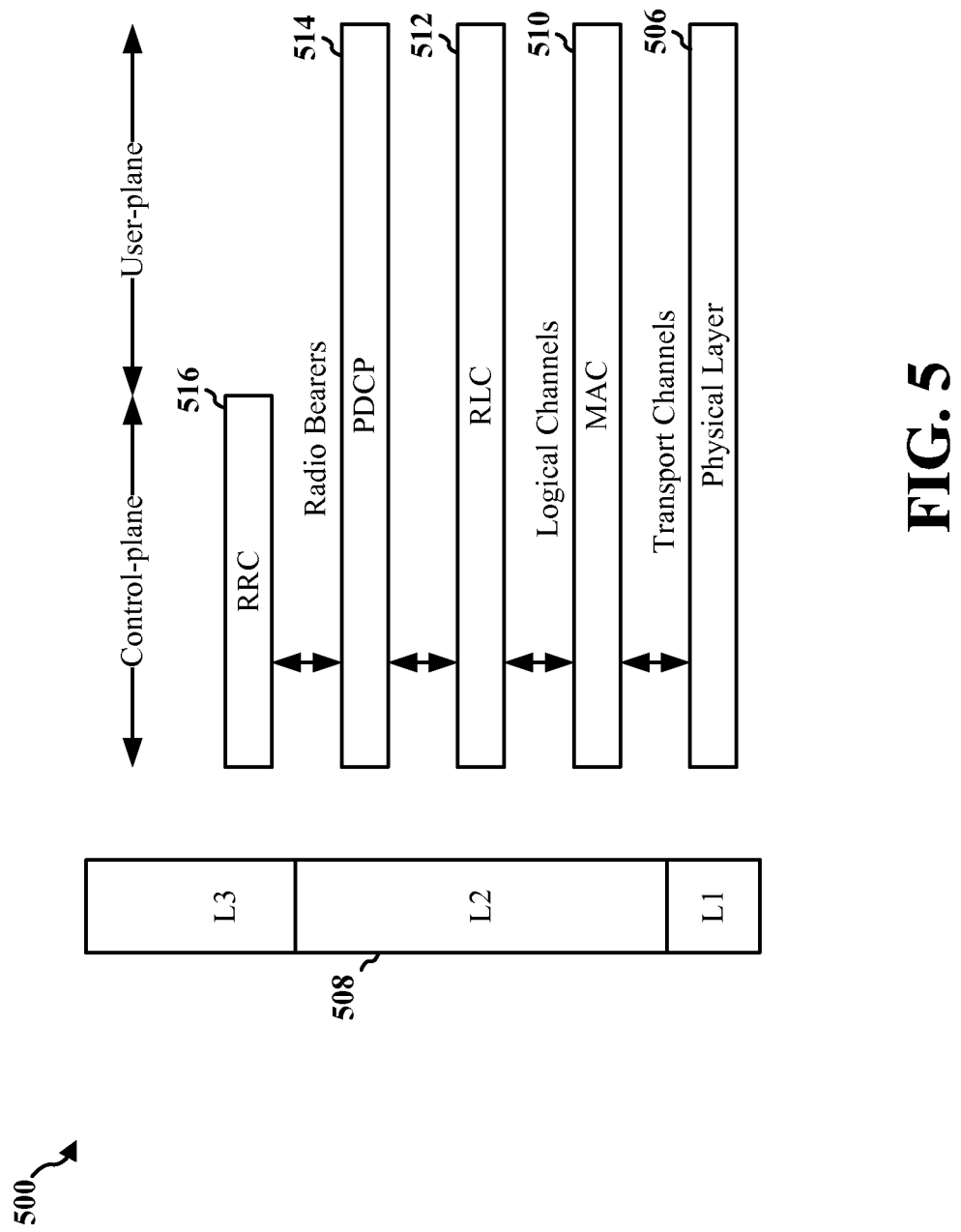
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
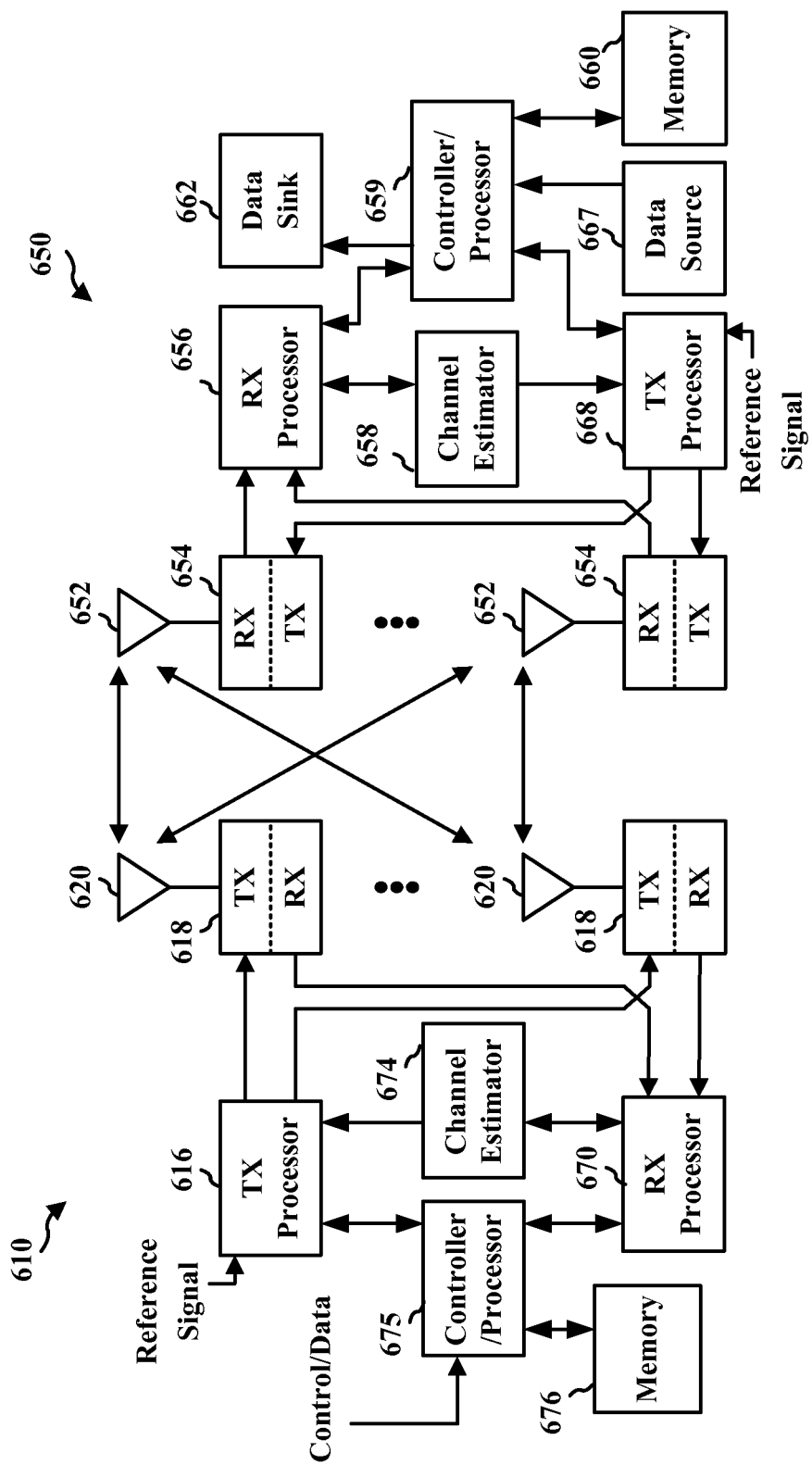
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
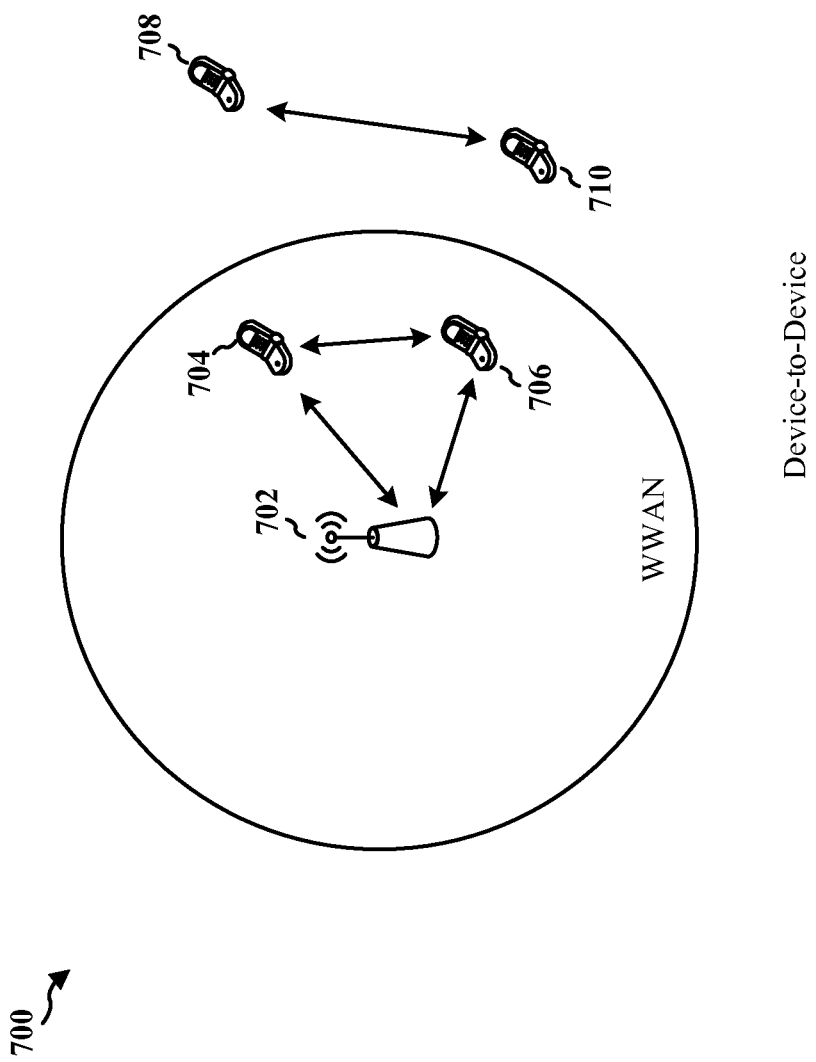
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device (or peer-to-peer) communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

In wireless networks, such as an LTE network, some UEs may know their location while other UEs may not. UEs that know their location may determine their location using global positioning system (GPS) technology. In yet another aspect, UEs may have a fixed location that is preconfigured. UEs that do not know their location may lack GPS or may be in an indoor environment. In some instances, UEs that do not know their location may position themselves using signals received from a base station. Positioning using base station signaling, however, may be inaccurate because the distance from the base station to the UE may be difficult to estimate accurately due to a lack of a direct path (e.g., non-line-of-sight). As such, the error in estimation may be significant (e.g., 50 meters or more).

In an aspect, a UE that does not know its location may determine its location from UEs that known their location using D2D positioning. D2D positioning through D2D signaling may be performed using techniques such as time of arrival (TOA) or time difference of arrival (TDOA). A UE may be position itself using TOA/TDOA and the known positions of proximate UEs.

Several challenges exist for positioning in a wireless network. One challenge is bandwidth. In LTE, for example, the maximum bandwidth may be 20 MHz per carrier which may limit the accuracy of estimation TOA/TDOA. Estimation accuracy may be improved by receiving D2D signals from many devices and by choosing good measurements. Another challenge is the timing offset among UEs, which may be up to a few microseconds. The timing offset may cause significant inaccuracies in estimating the TOA or TDOA. Yet another challenge is power consumption. If UEs have to be RRC_CONNCTED to perform positioning, then positioning may be power and resource consuming. As such, a need exists for using D2D positioning to enable UEs to determine their location in either RRC_CONNECTED or RRC_IDLE mode.

Figure 8:
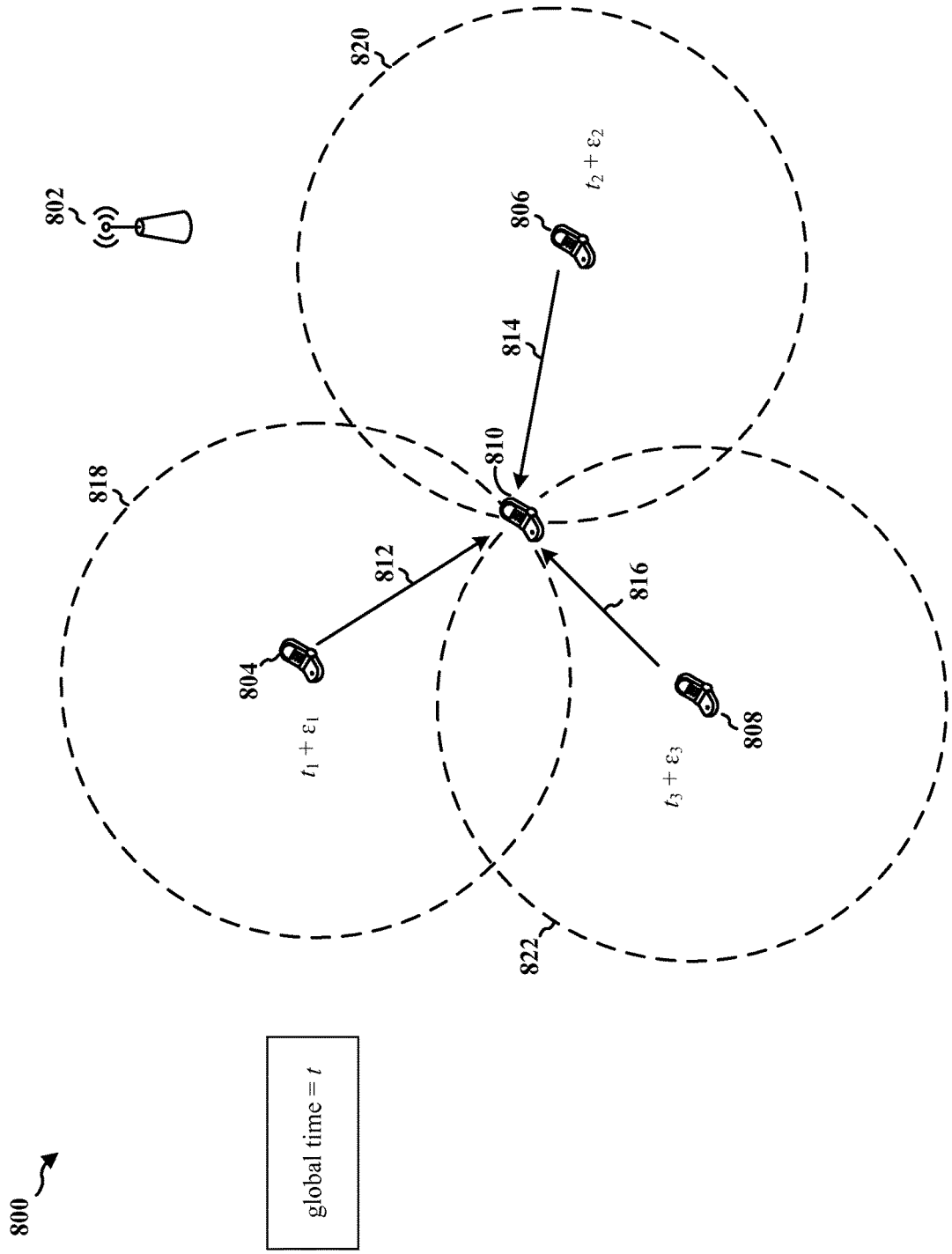
FIG. 8 illustrates a method for determining a device position using D2D positioning in a wireless network.

FIG. 8 illustrates a method for determining a device position using D2D positioning in a wireless network 800. Referring to FIG. 8, a base station 802 (e.g., an eNB) may be associated with a cell that includes UEs 804, 806, 808, 810. The cell may also include other UEs that are not pictured. The UEs 804, 806, 808 may be a group of UEs in which each of the UEs 804, 806, 808 knows its respective position/location. The UEs that are aware of their positions may be referred to as reference UEs or reference nodes. As such, the UEs 804, 806, 808 may be referred to as reference UEs. References UEs may transmit a D2D positioning message to help the UE 810 determine a position of the UE 810.

Referring to FIG. 8, each of the UEs 804, 806, 808 may transmit a respective positioning message 812, 814, 816 to the UE 810 (e.g., a D2D message). Each respective positioning message 812, 814, 816 may indicate a time at which the respective positioning message 812, 814, 816 is transmitted along with location information (e.g., x and y coordinates) of each of the respective UEs 804, 806, 808. In an ideal case, in which no synchronization offset exists between the UEs 804, 806, 808, 810, the UE 810 may determine a TOA for each of the three positioning messages 812, 814, 816 associated with the UE 804, 806, 808, respectively. Based on the difference between the TOA and the time at which the respective positioning messages 812, 814, 816 were sent, the UE 810 may determine the distance between each of the UEs 804, 806, 810 and the UE 810. For example, $\hat{d}_1$ may represent the measured distance (e.g., $\Delta t*c$) between the UE 804 and the UE 810, $\hat{d}_2$ may represent the measured distance between the UE 806 and the UE 810, and $\hat{d}_3$ may represent the measured distance between the UE 808 and the UE 810. In this example, $\Delta t$ represents the difference between a TOA and when a positioning message is sent and c represents the speed of light.

In one aspect, the UE 810 may determine its location using three circular regions 818, 820, 822. The three circular regions 818, 820, 822 may be based on the three measured distances $\hat{d}_1$, $\hat{d}_2$, $\hat{d}_3$ between the UEs 804, 806, 808 and the UE 810 and on the known sets of coordinates $(x_1, y_1)$, $(x_2, y_2)$, and $(x_3, y_3)$ which represent the position of each of the UEs 804, 806, 808, respectively. The known coordinates may represent the center of the circular region, and the distances may represent the radius of the circular region. The UE 810 may determine its position based on where the three circular regions 818, 820, 822 intersect.

In another aspect, the UE 804 may be associated with the known coordinates $(x_1, y_1)$, the UE 806 may be associated with the known coordinates $(x_2, y_2)$, the UE 808 may be associated with the known coordinates $(x_3, y_3)$, and the UE 810 may be associated with unknown coordinates $(x_4, y_4)$. Using the following equations, the UE 810 may determine its location by solving for $(x_4, y_4)$:

$$(x_4-x_1)^2+(y_4-y_1)^2=\hat{d}_1^2 \quad \text{(Eq. 1)}$$

$$(x_4-x_2)^2+(y_4-y_2)^2=\hat{d}_2^2 \quad \text{(Eq. 2)}$$

$$(x_4-x_3)^2+(y_4-y_3)^2=\hat{d}_3^2 \quad \text{(Eq. 3)}$$

These examples, however do not consider timing offsets between the UEs 804, 806, 808, 810. Small timing offsets between UEs may lead to significant inaccuracies. For example, a 100 ns timing offset between two reference UEs may result in a 30 meter positioning error (e.g., 100 ns*3×

$10^8$ m/s). To illustrate the timing offset problem, referring to FIG. 8, assume a global clock may be denoted by t. The UE 804 may be configured to transmit the positioning message 812 at time $t_1$, the UE 806 may be configured to transmit the positioning message 814 at time $t_2$, and the UE 808 may be configured to transmit the positioning message 816 at time $t_3$. Each of the UEs 804, 806, 808 may have a timing error/offset from the global clock t, such that the UE 804 actually transmits at $t_1+\epsilon_1$, the UE 806 actually transmits at $t_2+\epsilon_2$, and the UE 808 actually transmits at $t_3+\epsilon_3$. Because the UE 810 may be unaware of each of the timing offsets $\epsilon_1$, $\epsilon_2$, $\epsilon_3$, the UE 810 may not accurately determine the measured distances $\hat{d}_1, \hat{d}_2, \hat{d}_3$ between the UEs 804, 806, 808 and the UE 810. A distributed protocol is needed that allows reference UEs to synchronize more accurately among other reference UEs. A reference UE may adjust its transmission timing based on its location, detected positioning signals from other reference UEs, and the location of other reference UEs.

Figure 9A:
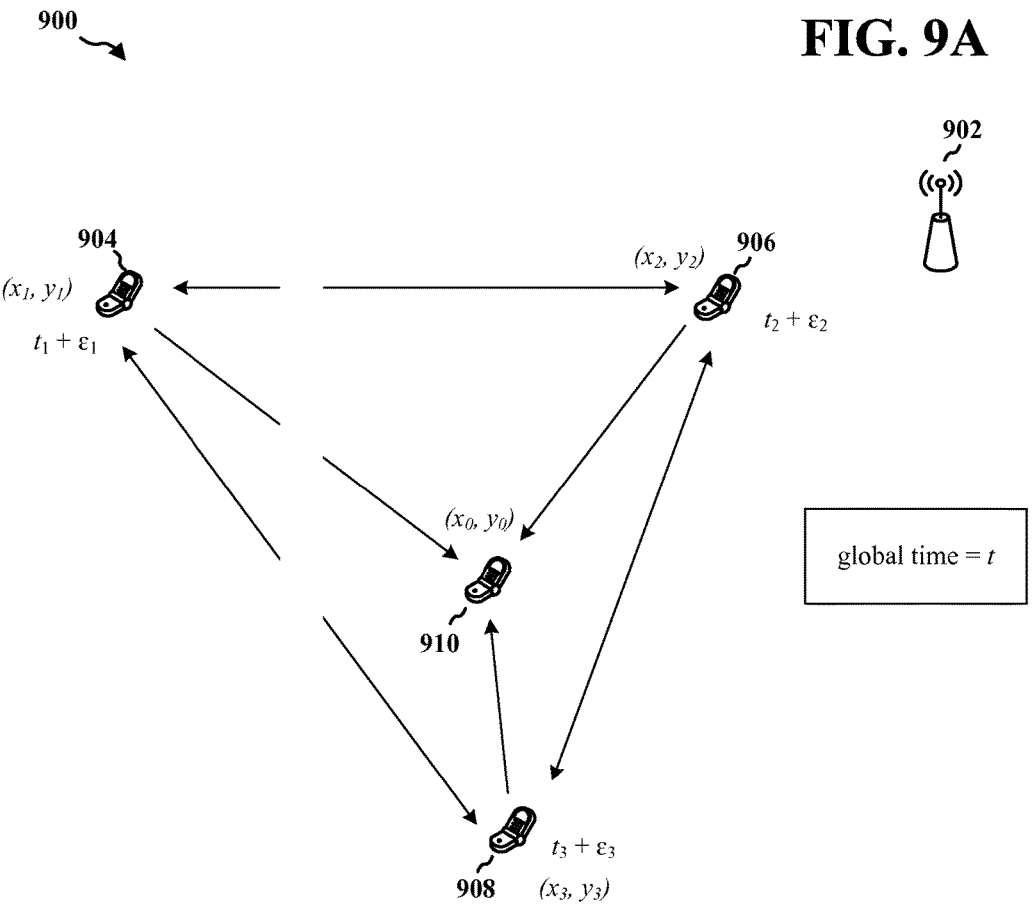
FIGS. 9A-B illustrate an exemplary method for enabling synchronization between devices for performing D2D positioning in a wireless network.
Figure 9B:
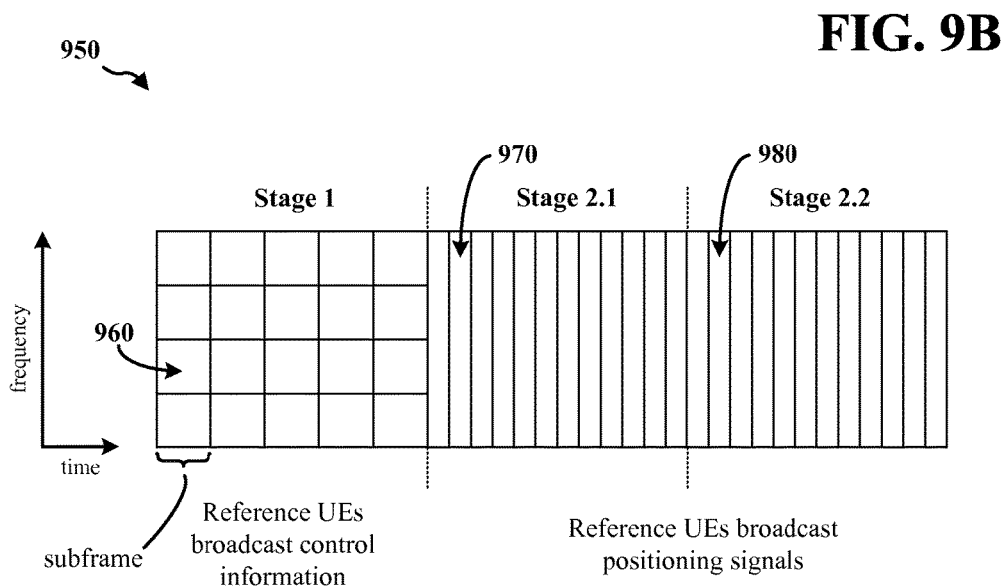

FIGS. 9A-B illustrate an exemplary method for enabling synchronization between devices for performing D2D positioning in a wireless network 900. Referring to FIG. 9A, a base station 902 (e.g., an eNB) may be associated with a cell that includes UEs 904, 906, 908, 910. The cell may also include other UEs that are not pictured. The UEs 904, 906, 908 may be a group of reference UEs, in which each of the UEs 904, 906, 908 knows its respective position. The UEs 904, 906, 908 may enable the UE 910 to determine its position/location based on D2D signaling.

To resolve the issue of synchronization between reference UEs for D2D positioning as previously discussed with respect to FIG. 8, the UEs 904, 906, 908 may first attempt to become synchronized. The synchronization process may occur in multiple stages.

FIG. 9B illustrates a set of resources 950. Stage 1 represents a first subset of the set of resources, stage 2.1 represents a second subset of the set of resources, and stage 2.2 represents a third subset of the set of resources. In stage 1, multiple subframes are depicted (e.g., each column may represent a subframe with corresponding subcarriers). In stages 2.1 and 2.2, each column may represent a symbol and all of the corresponding subcarriers associated with the symbol (e.g., an OFDM symbol). In stage 1, each reference UE, including the UE 904, may select one or more subframes (e.g., a resource 960) to transmit a message, and the message may include information about the position of the reference UE and a resource identifier (ID). The resource ID may identify one or more resources (e.g., a first symbol 970) on which the reference UE (e.g., the UE 904) may transmit a signal (e.g., positioning sequence, such as a Zadoff-Chu sequence). In an aspect, the resource ID may indicate a relative position of one or more resources within a subframe. Each reference UE, including the UE 904, may transmit m≥1 signals during stage 2. For example, if m=2, the reference UE, such as the UE 904, may transmit a sequence during stage 2.1 (e.g., in the first symbol 970) and another sequence during stage 2.2 (e.g., in a second symbol 980). In this example, the resource ID may identify at least one symbol in stage 2.1 (e.g., the second subset of the set of resources) and in stage 2.2 (e.g., the third subset of the set of resources) at which the UE 904 will transmit a sequence. If m=3, the reference UE may transmit a sequence during stages 2.1, 2.2, and 2.3. In this example, the resource ID may identify at least one symbol in stages 2.1, 2.2, and 2.3, which may correspond to the second, third and fourth subsets of the set of resources. If m=n, the reference UE may transmit a sequence during stages 2.1, . . . 2.n.

In an aspect, the reference UEs may determine the set of resources 950 on which to transmit the messages based on a resource message received from the base station 902 (the resource message may be received before the reference UEs transmit in the set of resources 950). That is, the base station 902 may transmit/broadcast the resource message to UEs that indicates the set of resources 950 for D2D positioning. The resource message from the base station 902 may indicate the first subset of the set of resources (e.g., stage 1), the second subset of the set of resources (e.g., stage 2.1), the third subset of the set of resources (e.g., stage 2.2), and any other number of subsets of the set of resources. In an aspect, the resource message may indicate a type of sequence to use for D2D positioning (e.g., a type of Zadoff-Chu sequence).

Upon determining the set of resources 950, the reference UEs may determine at least one resource (e.g., a subframe) for transmitting the message in stage 1. In one aspect, the at least one resource may be indicated by the resource message received from the base station 902 or in another message received from the base station 902. In another aspect, the reference UEs may determine the at least one resource autonomously (e.g., based on random selection or on energy-based detection (select the resource with the lowest energy)).

Similarly, the reference UEs may determine at least one symbol of the second subset of the set of resources for transmitting the sequence in stage 2.1 (or of any subset of the set of resources for transmitting the sequence). In one aspect, the at least one symbol may be indicated by the resource message received from the base station 902 or in another message received from the base station 902. In another aspect, the reference UEs may determine the at least one symbol autonomously (e.g., based on random selection or on energy-based detection (select the symbol with the lowest energy)).

Referring to FIGS. 9A and 9B, each UE 904, 906, 908, 910 may listen in stage 1 and stage 2.1, subject to the half duplex constraint, for messages and sequences from reference UEs. For example, the UE 904 may receive messages transmitted in stage 1 from the UEs 906, 908. The UE 906 may receive messages transmitted in stage 1 from the UEs 904, 908. The UE 908 may receive messages transmitted in stage 1 from the UEs 904, 906. Based on these received messages, the UEs 904, 906, 908 may listen in stage 2.1 and/or stage 2.2 for sequences transmitted by the other reference UEs. Although this example has 3 reference UEs, different numbers of reference UEs may be utilized for D2D positioning.

After each reference UE receives the sequences transmitted by other reference UEs, each reference UE may calculate the actual propagation delay based on its own location and the location of the other reference UEs (e.g., known from the messages in stage 1). Using the actual propagation delay and the time of arrival of the received sequence, each reference UE may estimate the time difference between itself and another reference UE. The estimated time difference may be used to adjust the timing of the sequence transmission in a subsequent stage (e.g., sequences received in stage 2.1 may be used to adjust the timing of transmissions in stage 2.2).

This process may be explained by an example. Assume a global clock t as in FIG. 8. Each of the reference UEs (e.g., the UEs 904, 906, 908) may be synchronized to the global clock t with some timing error/offset. The UE 904 may be configured to transmit a sequence at time $t_1$, the UE 906 may be configured to transmit a sequence at time $t_2$, and the UE 908 may be configured to transmit a sequence at time $t_3$. Each of the UEs 904, 906, 908 may have a timing error/ offsets from the global clock t, such that the UE 904 actually transmits at $t_1+\epsilon_1$, the UE 906 actually transmits at $t_2+\epsilon_2$, and the UE 908 actually transmits at $t_3+\epsilon_3$, where $\epsilon_1$, $\epsilon_2$, $\epsilon_3$, correspond to the timing offsets of the UEs 904, 906, 908, respectively.

Referring to FIG. 9A, the UE 906 may receive sequences from the UE 904 and the UE 908. Assuming the UE 904 transmits the sequence at time $t_1+\epsilon_1$, the UE 906 may receive the sequence and determine a propagation delay between the UEs 904, 906 and a time of arrival of the sequence based on when the sequence was received. The propagation delay may be determined by $d_1/c$, where $d_1$ is the actual distance between the UEs 904, 906 and c is the speed of light. The UE 906 may determine $d_1$ because the UE 906 knows its location and knows the location of the UE 904 based on the message received from the UE 904 in stage 1. The difference between the propagation delay and the difference between TOA and time sent represents the time difference, $\epsilon_2-\epsilon_1$, between the UEs 906, 904. In a similar fashion, the UE 906 may determine the time difference, $\epsilon_2-\epsilon_3$, between the UEs 906, 908. The UE 906 may determine an average time difference, $\epsilon_{avg,2}$, between the UE 906 and all reference UEs, using Eq. 4:

$$\epsilon_{avg,2} = \frac{\sum_{j=1}^{n}(\epsilon_2 - \epsilon_j)}{n} \quad (Eq.\ 4)$$

where n may correspond to the total number of reference UEs.

By determining an average time difference between the UE 906 and other the reference UEs, the UE 906 may adjust the transmission timing for the sequence in order to become more synchronized with the other reference UEs. The other references UEs (e.g., the UE 904, 908) may determine similar average time differences $\epsilon_{avg,1}$, $\epsilon_{avg,3}$. The UEs 904, 906, 908 may each adjust their respective clocks (e.g., $t_1+\epsilon_1-\epsilon_{avg,1}$) based on the respective average time differences $\epsilon_{avg,1}$, $\epsilon_{avg,2}$, $\epsilon_{avg,3}$, to approach a synchronized time difference c among all of the reference UEs. Depending on the number of sequences to be transmitted by the reference UEs, each reference UE may readjust the transmission timing to become more synchronized based on received sequences that have been time adjusted. For example, if m=2, then each reference UE may use the first sequence from other reference UEs to adjust the transmission timing and transmit a second sequence that enables the UE 910 to determine the position of the UE 910. If m=3, then each reference UE may use the first two sequences from other reference UEs to adjust and readjust the transmission timing and transmit a third sequence that enables the UE 910 to determine the position of the UE 910. If m=n, then each reference UE may use n−1 sequences from other reference UEs to adjust and readjust the transmission timing and transmit an nth sequence that enables the UE 910 to determine the position of the UE 910.

Referring to FIGS. 9A-B, assuming m=2, at stage 2.2, the UE 910 may receive sequences from the UEs 904, 906, 908 based on the synchronized timing offset, $\epsilon$. For example, due to synchronization, the UE 904 may transmit the sequence at time $t_1+\epsilon$, the UE 906 may transmit the sequence at time $t_2+\epsilon$, and the UE 908 may transmit the sequence at time $t_3+\epsilon$. Assuming the UE 910 has a timing offset of $\epsilon_0$, the UE 910 may determine its position based on the following equations:

$$\hat{d}_1 = \left(\epsilon - \epsilon_0 + \frac{d_1}{c}\right)c = d_1 + (\epsilon - \epsilon_0)c \quad (Eq.\ 5)$$

$$\hat{d}_2 = \left(\epsilon - \epsilon_0 + \frac{d_2}{c}\right)c = d_2 + (\epsilon - \epsilon_0)c \quad (Eq.\ 6)$$

$$\hat{d}_3 = \left(\epsilon - \epsilon_0 + \frac{d_3}{c}\right)c = d_3 + (\epsilon - \epsilon_0)c \quad (Eq.\ 7)$$

where $\hat{d}_1$, $\hat{d}_2$, $\hat{d}_3$ are the respective measured distances between UE 904 and UE 910, UE 906 and UE 910, and UE 908 and UE 910. The UE 910 may calculate the respective values $\hat{d}_1$, $\hat{d}_2$, $\hat{d}_3$ by determining the difference between the time each respective sequence was sent and received (e.g., time of arrival) and by multiplying the difference by c.

Based on Eqs. 5-7, the UE 910 may solve for its position $(x_0, y_0)$ by taking the difference between Eqs. 5 and 6 and by taking the difference between Eqs. 6 and 7. Because the timing difference terms are the same, the timing difference terms drop out to create Eqs. 8 and 9:

$$\hat{d}_1 - \hat{d}_2 = d_1 - d_2 \quad (Eq.\ 8)$$

$$\hat{d}_2 - \hat{d}_3 = d_2 - d_3 \quad (Eq.\ 9)$$

where $d_1$ is the distance between $(x_1, y_1)$ and $(x_0, y_0)$, $d_2$ is the distance between $(x_2, y_2)$ and $(x_0, y_0)$, and $d_3$ is the distance between $(x_3, y_3)$ and $(x_0, y_0)$. Because the values for $(x_1, y_1)$, $(x_2, y_2)$, and $(x_3, y_3)$ are all known, the UE 910 may solve for $(x_0, y_0)$ to determine the location of the UE 910. As such, in this example, the UE 910 and other UEs with unknown locations may use the sequence in stage 2.2 to estimate location. In an aspect, the UE 910 may determine its position using D2D signaling whether in RRC_CONNECTED mode or RRC_IDLE mode.

Although the aforementioned example with respect to FIG. 9B includes stages 1, 2.1, and 2.2, the reference UEs may determine to use additional stages (e.g., stages 1, 2.1, 2.2, and 2.3). As such, in stage 2.1 and 2.2, the reference UEs may adjust and readjust the transmission timing accordingly based on sequences received from other reference UEs.

Figure 10:
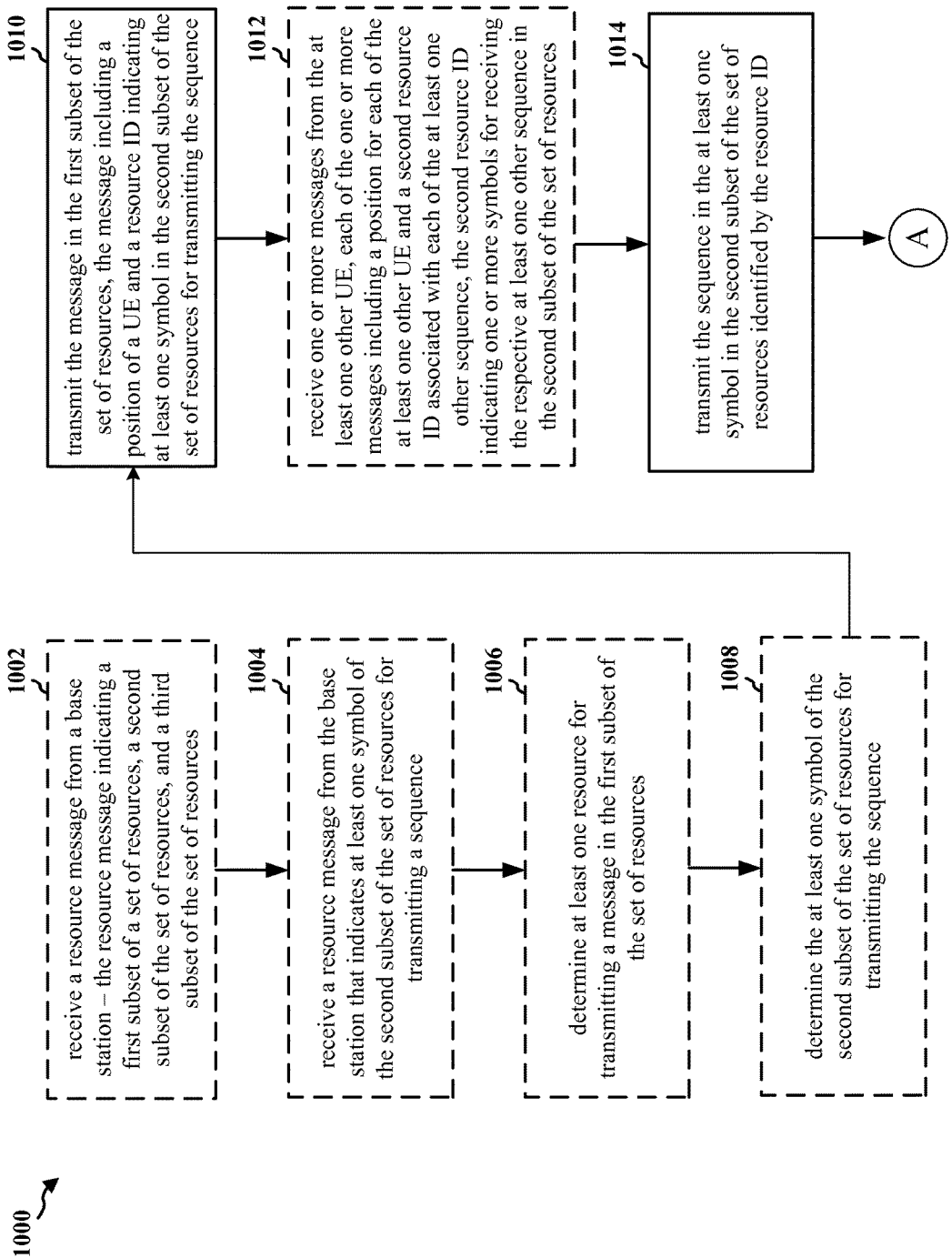
FIGS. 10-11 are flowcharts of a method of wireless communication.
Figure 11:
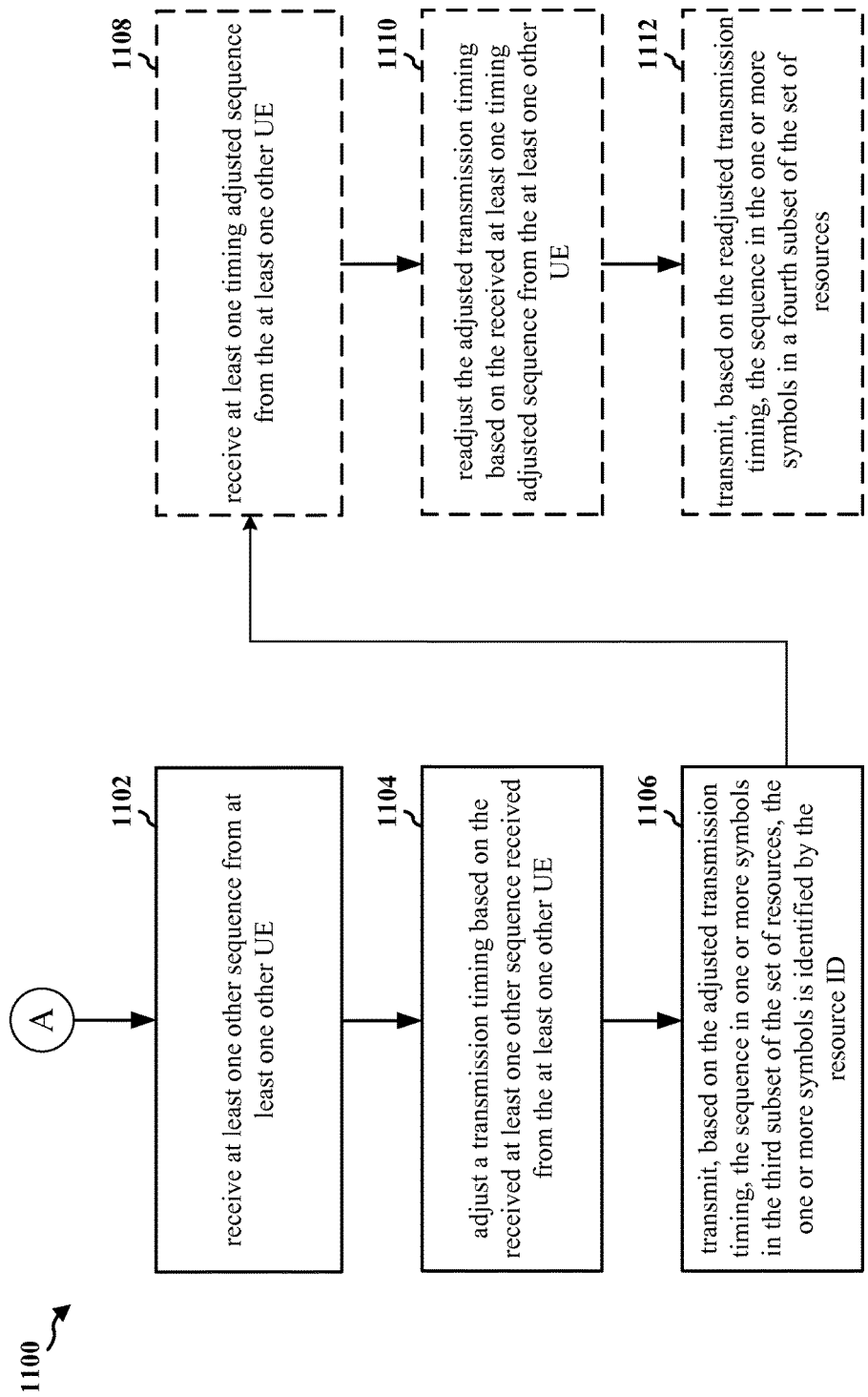

FIGS. 10-11 are flowcharts 1000, 1100 of a method of wireless communication. The method may be performed by a UE (e.g., the UE 906, the apparatus 1202/1202'). At 1002, the UE may receive a resource message from a base station. The resource message may indicate a first subset of a set of resources, a second subset of the set of resources, and a third subset of the set of resources. For example, referring to FIGS. 9A-B, the UE may be the UE 906. The UE 906 may receive the resource message from the base station 902. The resource message may indicate a first subset of the set of resources 950 corresponding to stage 1, the second subset of the set of resources 950 corresponding to stage 2.1, and the third subset of the set of resources 950 corresponding to stage 2.2. The set of resources 950 may be periodic.

At 1004, the UE may receive a resource message from the base station that indicates at least one symbol of the second subset of the set of resources for transmitting a sequence. For example, referring to FIGS. 9A-B, the UE 906 may receive a resource message from the base station 902 that indicates a symbol of the second subset of the set of resources 950 for transmitting a Zadoff-Chu sequence. In an aspect, the resource message indicating the first, second, and third subset of the set of resources 950 and the resource message indicating the at least one symbol of the second subset of the set of resources for transmitting the sequence may be the same or different resource messages. In another aspect, the resource message may indicate at least one symbol for transmitting a sequence in multiple subsets of the set of resources.

At 1006, the UE may determine at least one resource for transmitting a message in the first subset of the set of resources. For example, referring to FIGS. 9A-B, the UE 906 may determine at least one resource for transmitting a message in stage 1, which corresponds to the first subset of the set of resources 950. The UE 906 may determine the at least one resource autonomously, such as random selection or energy level based detection. In energy level based detection, the UE 906 may detect an energy level of one or more resources in the first subset of the set of resources 950 and determine one or more resources with the lowest energy detected. The UE 906 may select the resources(s) with the lowest energy detected for transmitting the message in the first subset of the set of resources 950.

At 1008, the UE may determine the at least one symbol of the second subset of the set of resources for transmitting the sequence. For example, referring to FIGS. 9A-B, the UE 906 may determine the at least one symbol of the second subset of the set of resources 950 for transmitting a Zadoff-Chu sequence. The UE 906 may determine the at least symbol autonomously, such as random selection or energy level based detection. In energy level based detection, the UE 906 may detect an energy level of one or more symbols in the second subset of the set of resources 950 and determine one or more symbols with the lowest energy detected. The UE 906 may select the symbol(s) with the lowest energy detected for transmitting the sequence in the second subset of the set of resources 950.

At 1010, the UE may transmit the message in a first subset of the set of resources. The message may include a position of the UE and a resource ID indicating the at least one symbol in the second subset of the set of resources for transmitting the sequence. In an aspect, the resource ID may indicate at least one symbol in multiple subsets of the set of resources for transmitting the sequence. For example, referring to FIGS. 9A-B, the UE 906 may transmit the message in the first subset of the set of resources. The message may include the position/location of the UE 906 and a resource ID indicating a symbol in the second subset of the set of resources for transmitting the Zadoff-Chu sequence. In an aspect, the resource ID may be an index used to identify the at least one symbol (e.g., the resource ID may indicate a relative position of a symbol within a subframe).

At 1012, the UE may receive one or more messages from the at least one other UE. Each of the one or more messages may include a position for each of the at least one other UE and a second resource ID associated with each of the at least one other sequence. The second resource ID may indicate one or more symbols for receiving the respective at least one other sequence in the second subset of the set of resources. In an aspect, the second resource ID may indicate one or more symbols for receiving the respective at least one other sequence in multiple subsets of the set of resources. For example, referring to FIGS. 9A-B, the UE 906 may receive one or more messages from the UEs 904, 908. The message from the UE 904 may include a position of the UE 904 and a second resource ID associated with at least one sequence to be transmitted by the UE 904. The message from the UE 908 may include a position of the UE 908 and a second resource ID associated with at least one sequence to be transmitted by the UE 908. For both the UEs 904, 908, the second resource ID in the respective messages may indicate one or more symbols for receiving the respective at least one sequence in the second subset of the set of resources from the UEs 904, 908.

At 1014, the UE may transmit the sequence in at least one symbol in the second subset of the set of resources identified by the resource ID. For example, referring to FIGS. 9A-B, the UE 906 may transmit the sequence (e.g., a Zadoff-Chu sequence) in at least one symbol in the second subset of the set of resources identified by the resource ID included in the message transmitted in the first subset of the set of resources.

The method discussed in FIG. 10 continues with FIG. 11. At 1102, the UE may receive at least one other sequence from at least one other UE. For example, referring to FIGS. 9A-B, the UE 906 may receive a sequence from the UE 904 and receive a sequence from the UE 908 in the second subset of the set of resources 950 (e.g., in stage 2.1).

At 1104, the UE may adjust a transmission timing based on the received at least one other sequence received from the at least one other UE. In an aspect, the UE may adjust the transmission timing by determining a propagation delay between the UE and the at least one other UE, determining a time of arrival between the UE and the at least one other UE based on the received at least one other sequence, and determining a time difference between the UE and the at least one other UE based on the determined propagation delay and the determined time of arrival. In another aspect, the UE may adjust the transmission timing by further determining the transmission timing based on all of the determined time differences between the UE and the at least one other UEs. The adjusted transmission timing may enable transmission synchronization with the at least one other UE. For example, referring to FIGS. 9A-B, the UE 906 may adjust the transmission timing based on the received sequences from the UEs 904, 908. In this example, the UE 906 adjusts the transmission timing by determining a propagation delay (e.g., $$\frac{d}{c})$$

between me UL 906 and the UEs 904, 908 based on sequences received from the UEs 904, 908, by determining a TOA between the UE and each of the UEs 904, 908, and by determining a time difference between the UE 906 and the UEs 904, 908 (e.g., $\epsilon_2-\epsilon_1$, $\epsilon_2-\epsilon_3$). Then, the UE 906 adjusts the transmission timing by determining the transmission timing based on all of the determined time differences between the UE 906 and the UEs 904, 908. The UE 906 may average all of the determined time differences to obtain $$\epsilon_{avg,2} = \frac{\sum_{j=1}^{n}(\epsilon_2 - \epsilon_j)}{n}.$$

The UE 906 may adjust the clock by subtracting or adding $\epsilon_{avg,2}$. This adjusted transmission timing enables transmission synchronization with the UEs 904, 908.

At 1106, the UE may transmit, based on the adjusted transmission timing, the sequence in one or more symbols in the third subset of the set of resources, in which the one or more symbols may be identified by the resource ID. For example, referring to FIGS. 9A-B, the UE 906 may transmit, based on the adjusted transmission timing, the sequence in or more symbols in the third subset of the set of resources 950 (e.g., stage 2.2), in which the one or more symbols in stage 2.2 may be identified by the resource ID. In an aspect, the sequence transmitted in stage 2.2 may enable the UE 910 to determine a position of the UE 910.

At 1108, the UE may receive at least one timing adjusted sequence from the at least one other UE. For example, referring to FIGS. 9A-B, assuming that the UE 904 or the UE 908 is transmitting more than 2 sequences (e.g., m>2), at least the second sequence received from the UE 904 or the UE 908 may be a timing adjusted sequence. That is, the UE 904 and/or the UE 908 may have adjusted a transmission timing based on sequences received from other reference UEs and are now transmitting a timing adjusted sequence.

At 1110, the UE may readjust the adjusted transmission timing based on the received at least one timing adjusted sequence from the at least one other UE. For example, referring to FIGS. 9A-B, the UE 906 may readjust the adjusted transmission timing based on the received at least one timing adjusted sequence from the UE 904 and the UE 908. That is, after adjusting the clock by $\epsilon_{avg,2}$, the UE 906 may receive timing adjusted sequences from the UEs 904, 908 and determine a second propagation delay between the UE 906 and the UEs 904, 908 based on known positions of the UEs 904, 906, 908, determine a second time of arrival between the UE 906 and the UEs 904, 908 based on the timing adjusted sequences, determine a second time difference the UE 906 and the UEs 904, 908. The UE 906 may average all of the second time differences to readjust the transmission timing for transmitting sequences.

At 1112, the UE may transmit, based on the readjusted transmission timing, the sequence in the one or more symbols in a fourth subset of the set of resources. For example, referring to FIG. 9A, the UE 906 may transmit, based on the readjusted transmission timing, the sequence in one or more symbols in a fourth subset of the set of resources (e.g., in stage 2.3 which is not pictured). In an aspect, the sequence transmitted, based on the readjusted transmission timing, may be more synchronized than the sequence transmitted in stage 2.2. The sequence transmitted in stage 2.3 may enable the UE 910 to determine a position of the UE 910.

Figure 12:
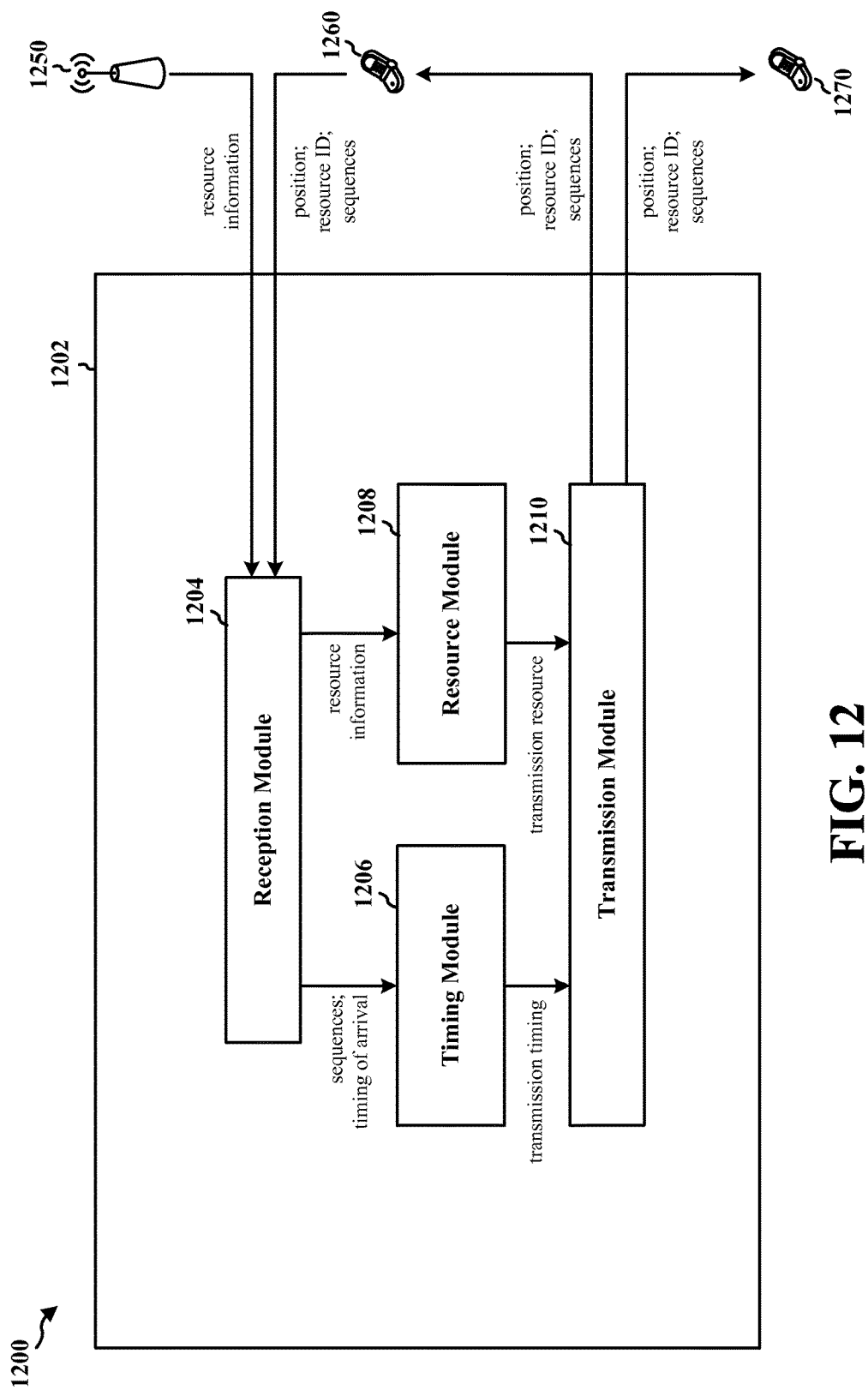
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus includes a reception module 1204, a timing module 1206, a resource module 1208, and a transmission module 1210.

The transmission module 1210 may be configured to transmit a message in a first subset of a set of resources. The message may include a position of the apparatus and a resource ID indicating at least one symbol in a second subset of the set of resources for transmitting a sequence. The transmission module 1210 may be configured to transmit the sequence in the at least one symbol in the second subset of the set of resources identified by the resource ID. The reception module 1204 may be configured to receive at least one other sequence from at least one other UE 1260. The timing module 1206 may be configured to adjust a transmission timing based on the received at least one other sequence received from the at least one other UE 1260. The transmission module 1210 may be configured to transmit, based on the adjusted transmission timing, the sequence in one or more symbols in a third subset of the set of resources, in which the one or more symbols is identified by the resource ID. In an aspect, the adjusted transmission timing enables transmission synchronization with the at least one other UE 1260. In another aspect, the sequence transmitted, based on the adjusted transmission timing, in the third subset enables a second UE 1270 to determine a position of the second UE 1270. In one configuration, the reception module 1204 may be configured to receive at least one timing adjusted sequence from the at least one other UE 1260. In this aspect, the timing module 1206 may be configured to readjust the adjusted transmission timing based on the received at least one timing adjusted sequence from the at least one other UE 1260, and the transmission module 1210 may be configured to transmit, based on the readjusted transmission timing, the sequence in the one or more symbols in a fourth subset of the set of resources. In another aspect, the sequence transmitted, based on the readjusted transmission timing, in the fourth subset enables the second UE 1270 to determine a position of the second UE 1270. In another aspect, the timing module 1206 may be configured to adjust the transmission timing by determining a propagation delay between the apparatus and the at least one other UE 1260, by determining a time of arrival between the apparatus and the at least one other UE 1260 based on the received at least one other sequence, and by determining a time difference between the apparatus and the at least one other UE 1260 based on the determined propagation delay and the determined time of arrival. In yet another aspect, the timing module 1206 may be configured to adjust the transmission timing by determining the transmission timing based on all of the determined time differences between the apparatus and the at least one other UE 1260. In another configuration, the reception module 1204 may be configured to receive one or more messages from the at least one other UE 1260. Each of the one or more messages may include a position for each of the at least one other UE 1260 and a second resource ID associated with each of the at least one other sequence. The second resource ID may indicate one or more symbols for receiving the respective at least one other sequence in the second subset of the set of resources. In another configuration, the reception module 1204 may be configured to receive a resource message from a base station 1250. The resource message may indicate the first subset of the set of resources, the second subset of the set of resources, and the third subset of the set of resources. In another configuration, the resource module 1208 may be configured to determine at least one resource for transmitting the message in the first subset of the set of resources. In another configuration, the resource module 1208 may be configured to determine the at least one symbol of the second subset of the set of resources for transmitting the sequence. In an aspect, the determination may be based on a random selection or an energy-based detection. In another configuration, the reception module 1204 may be configured to receive a resource message from the base station 1250 that indicates the at least one symbol of the second subset of the set of resources for transmitting the sequence, in which the determination of the at least one symbol is based on the received message.

The apparatus may include additional modules that perform each of the blocks of the algorithm in the aforementioned flowcharts of FIGS. 10 and 11. As such, each block in the aforementioned flowcharts of FIGS. 10 and 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
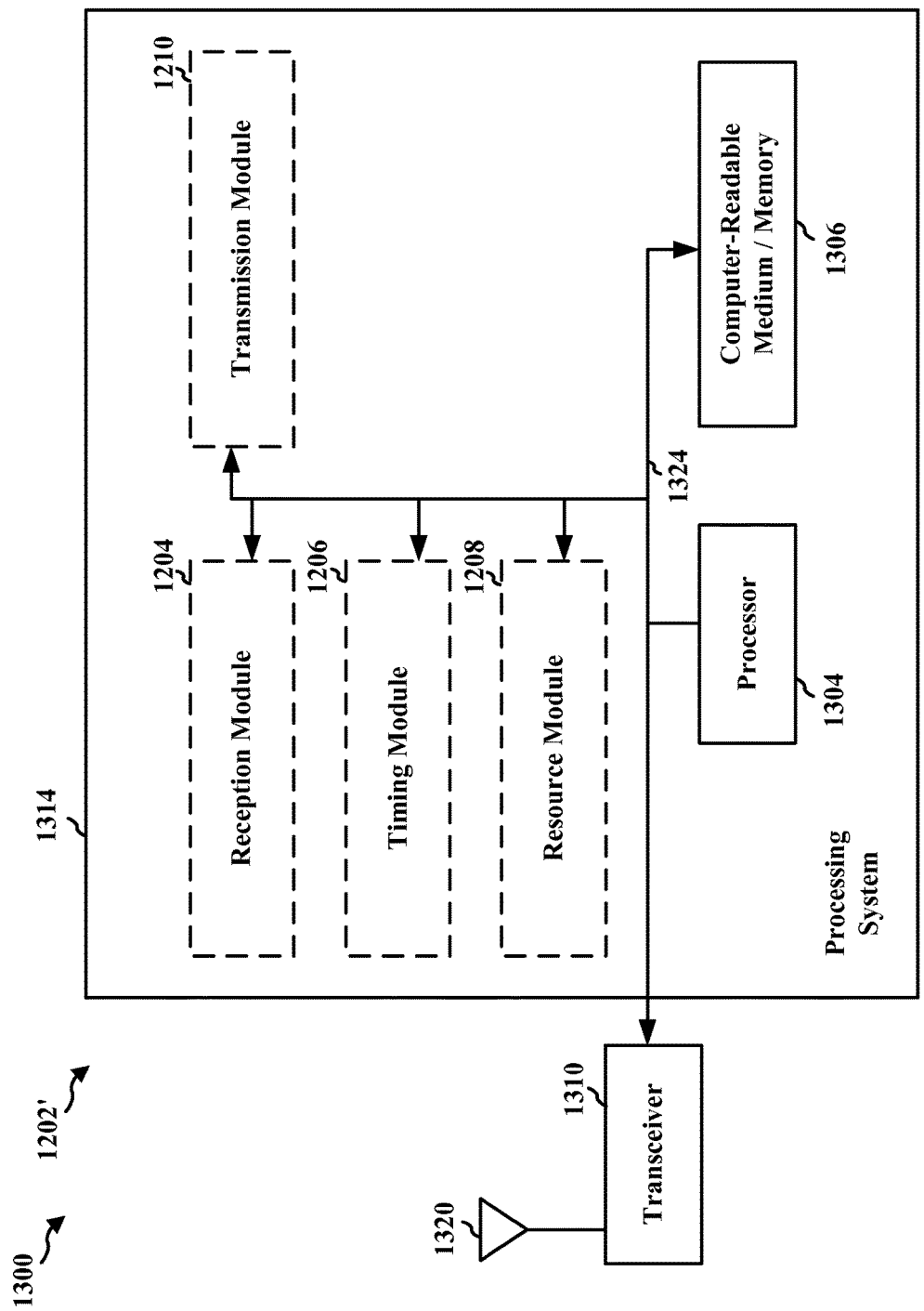
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception module 1204. In addition, the transceiver 1310 receives information from the processing system 1314, specifically the transmission module 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, and 1210. The modules may be software modules running in the processor 1304, resident/stored in the computer readable medium/memory 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for transmitting a message in a first subset of a set of resources. The message may include a position of the apparatus and a resource ID indicating at least one symbol in a second subset of the set of resources for transmitting a sequence. The apparatus includes means for transmitting the sequence in the at least one symbol in the second subset of the set of resources identified by the resource ID. The apparatus includes mean for receiving at least one other sequence from at least one other UE. The apparatus includes means for adjusting a transmission timing based on the received at least one other sequence received from the at least one other UE. The apparatus includes means for transmitting, based on the adjusted transmission timing, the sequence in one or more symbols in a third subset of the set of resources, in which the one or more symbols is identified by the resource ID. In an aspect, the adjusted transmission timing enables transmission synchronization with the at least one other UE. In another aspect, the sequence transmitted, based on the adjusted transmission timing, in the third subset enables a second UE to determine a position of the second UE. In one configuration, the apparatus may include means for receiving at least one timing adjusted sequence from the at least one other UE. In this configuration, the apparatus may include means for readjusting the adjusted transmission timing based on the received at least one timing adjusted sequence from the at least one other UE and means for transmitting, based on the readjusted transmission timing, the sequence in the one or more symbols in a fourth subset of the set of resources. In an aspect, the sequence transmitted, based on the readjusted transmission timing, in the fourth subset enables a second UE to determine a position of the second UE. In another configuration, the means for adjusting the transmission timing may be configured to determine a propagation delay between the apparatus and the at least one other UE, to determine a time of arrival between the apparatus and the at least one other UE based on the received at least one other sequence, and to determine a time difference between the apparatus and the at least one other UE based on the determined propagation delay and the determined time of arrival. In another configuration, the means for adjusting the transmission timing may further be configured to determine the transmission timing based on all of the determined time differences between the apparatus and the at least one other UE. In another configuration, the apparatus may include means for receiving one or more messages from the at least one other UE. Each of the one or more messages may include a position for each of the at least one other UE and a second resource ID associated with each of the at least one other sequence. The second resource ID may indicate one or more symbols for receiving the respective at least one other sequence in the second subset of the set of resources. In another configuration, the apparatus may include means for receiving a resource message from a base station. The resource message may indicate the first subset of the set of resources, the second subset of the set of resources, and the third subset of the set of resources. In another configuration, the apparatus may include means for determining at least one resource for transmitting the message in the first subset of the set of resources. In another configuration, the apparatus may include means for determining the at least one symbol of the second subset of the set of resources for transmitting the sequence. In an aspect, the determination may be based on a random selection or an energy-based detection. In another configuration, the apparatus may include means for receiving a resource message from a base station that indicates the at least one symbol of the second subset of the set of resources for transmitting the sequence. In this configuration, the determination of the at least one symbol may be based on the received message. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
   transmitting a message in a first subset of a set of resources, the message comprising a position of the UE and a resource identifier (ID) indicating at least one symbol in a second subset of the set of resources for transmitting a sequence;
   transmitting the sequence in the at least one symbol in the second subset of the set of resources identified by the resource ID;
   receiving at least one other sequence from at least one other UE;
   adjusting a transmission timing based on the received at least one other sequence received from the at least one other UE; and
   transmitting, based on the adjusted transmission timing, the sequence in one or more symbols in a third subset of the set of resources, wherein the one or more symbols is identified by the resource ID, wherein the transmitted sequence enables another UE to perform device-to-device (D2D) positioning.

2. The method of claim 1, wherein the adjusted transmission timing enables transmission synchronization with the at least one other UE.

3. The method of claim 1, wherein the sequence transmitted, based on the adjusted transmission timing, in the third subset enables a second UE to determine a position of the second UE.

4. The method of claim 1, furthering comprising:
   receiving at least one timing adjusted sequence from the at least one other UE; and
   readjusting the adjusted transmission timing based on the received at least one timing adjusted sequence from the at least one other UE; and
   transmitting, based on the readjusted transmission timing, the sequence in the one or more symbols in a fourth subset of the set of resources.

5. The method of claim 4, wherein the sequence transmitted, based on the readjusted transmission timing, in the fourth subset enables a second UE to determine a position of the second UE.

6. The method of claim 1, wherein the adjusting the transmission timing comprises:
   determining a propagation delay between the UE and the at least one other UE;
   determining a time of arrival between the UE and the at least one other UE based on the received at least one other sequence; and
   determining a time difference between the UE and the at least one other UE based on the determined propagation delay and the determined time of arrival.

7. The method of claim 6, wherein the adjusting the transmission timing further comprises determining the transmission timing based on all of the determined time differences between the UE and the at least one other UE.

8. The method of claim 1, further comprising receiving one or more messages from the at least one other UE, each of the one or more messages comprising a position for each of the at least one other UE and a second resource ID associated with each of the at least one other sequence, the second resource ID indicating one or more symbols for receiving the respective at least one other sequence in the second subset of the set of resources.

9. The method of claim 1, further comprising receiving a resource message from a base station, the resource message indicating the first subset of the set of resources, the second subset of the set of resources, and the third subset of the set of resources.

10. The method of claim 1, further comprising determining at least one resource for transmitting the message in the first subset of the set of resources.

11. The method of claim 1, further comprising determining the at least one symbol of the second subset of the set of resources for transmitting the sequence.

12. The method of claim 11, wherein the determination is based on a random selection or an energy-based detection.

13. The method of claim 11, further comprising receiving a resource message from a base station that indicates the at least one symbol of the second subset of the set of resources for transmitting the sequence, wherein the determination of the at least one symbol is based on the received message.

14. An apparatus for wireless communication, comprising:
   means for transmitting a message in a first subset of a set of resources, the message comprising a position of the apparatus and a resource identifier (ID) indicating at least one symbol in a second subset of the set of resources for transmitting a sequence;
   means for transmitting the sequence in the at least one symbol in the second subset of the set of resources identified by the resource ID;

means for receiving at least one other sequence from at least one other UE;
means for adjusting a transmission timing based on the received at least one other sequence received from the at least one other UE; and
means for transmitting, based on the adjusted transmission timing, the sequence in one or more symbols in a third subset of the set of resources, wherein the one or more symbols is identified by the resource ID, wherein the transmitted sequence enables another UE to perform device-to-device (D2D) positioning.

15. The apparatus of claim 14, furthering comprising:
means for receiving at least one timing adjusted sequence from the at least one other UE; and
means for readjusting the adjusted transmission timing based on the received at least one timing adjusted sequence from the at least one other UE; and
means for transmitting, based on the readjusted transmission timing, the sequence in the one or more symbols in a fourth subset of the set of resources.

16. The apparatus of claim 14, further comprising means for receiving one or more messages from the at least one other UE, each of the one or more messages comprising a position for each of the at least one other UE and a second resource ID associated with each of the at least one other sequence, the second resource ID indicating one or more symbols for receiving the respective at least one other sequence in the second subset of the set of resources.

17. The apparatus of claim 14, further comprising means for receiving a resource message from a base station, the resource message indicating the first subset of the set of resources, the second subset of the set of resources, and the third subset of the set of resources.

18. The apparatus of claim 14, further comprising means for determining at least one resource for transmitting the message in the first subset of the set of resources.

19. The apparatus of claim 14, further comprising means for determining the at least one symbol of the second subset of the set of resources for transmitting the sequence.

20. The apparatus of claim 19, further comprising receiving a resource message from a base station that indicates the at least one symbol of the second subset of the set of resources for transmitting the sequence, wherein the determination of the at least one symbol is based on the received message.

21. An apparatus for wireless communication, comprising:
a memory; and
at least one processor coupled to the memory and configured to:
transmit a message in a first subset of a set of resources, the message comprising a position of the apparatus and a resource identifier (ID) indicating at least one symbol in a second subset of the set of resources for transmitting a sequence;
transmit the sequence in the at least one symbol in the second subset of the set of resources identified by the resource ID;
receive at least one other sequence from at least one other UE;
adjust a transmission timing based on the received at least one other sequence received from the at least one other UE; and
transmit, based on the adjusted transmission timing, the sequence in one or more symbols in a third subset of the set of resources, wherein the one or more symbols is identified by the resource ID, wherein the transmitted sequence enables another UE to perform device-to-device (D2D) positioning.

22. The apparatus of claim 21, wherein the at least one processor is further configured to:
receive at least one timing adjusted sequence from the at least one other UE; and
readjust the adjusted transmission timing based on the received at least one timing adjusted sequence from the at least one other UE; and
transmit, based on the readjusted transmission timing, the sequence in the one or more symbols in a fourth subset of the set of resources.

23. The apparatus of claim 21, wherein the at least one processor is further configured to adjust the transmission timing by:
determining a propagation delay between the apparatus and the at least one other UE;
determining a time of arrival between the apparatus and the at least one other UE based on the received at least one other sequence; and
determining a time difference between the apparatus and the at least one other UE based on the determined propagation delay and the determined time of arrival.

24. The apparatus of claim 23, wherein the at least one processor is further configured to adjust the transmission timing by determining the transmission timing based on all of the determined time differences between the apparatus and the at least one other UE.

25. The apparatus of claim 21, wherein the at least one processor is further configured to receive one or more messages from the at least one other UE, each of the one or more messages comprising a position for each of the at least one other UE and a second resource ID associated with each of the at least one other sequence, the second resource ID indicating one or more symbols for receiving the respective at least one other sequence in the second subset of the set of resources.

26. The apparatus of claim 21, wherein the at least one processor is further configured to receive a resource message from a base station, the resource message indicating the first subset of the set of resources, the second subset of the set of resources, and the third subset of the set of resources.

27. The apparatus of claim 21, wherein the at least one processor is further configured to determine at least one resource for transmitting the message in the first subset of the set of resources.

28. The apparatus of claim 21, wherein the at least one processor is further configured to determine the at least one symbol of the second subset of the set of resources for transmitting the sequence.

29. The apparatus of claim 28, wherein the at least one processor is further configured to receive a resource message from a base station that indicates the at least one symbol of the second subset of the set of resources for transmitting the sequence, wherein the determination of the at least one symbol is based on the received message.

30. A non-transitory computer-readable medium storing computer executable code associated with a user equipment (UE) for wireless communication, comprising code for:
transmitting a message in a first subset of a set of resources, the message comprising a position of the UE and a resource identifier (ID) indicating at least one symbol in a second subset of the set of resources for transmitting a sequence;
transmitting the sequence in the at least one symbol in the second subset of the set of resources identified by the resource ID;

receiving at least one other sequence from at least one other UE;
adjusting a transmission timing based on the received at least one other sequence received from the at least one other UE; and
transmitting, based on the adjusted transmission timing, the sequence in one or more symbols in a third subset of the set of resources, wherein the one or more symbols is identified by the resource ID, wherein the transmitted sequence enables another UE to perform device-to-device (D2D) positioning.

* * * * *